United States Patent [19]

Meckler

[11] Patent Number: 5,297,398
[45] Date of Patent: Mar. 29, 1994

[54] POLYMER DESICCANT AND SYSTEM FOR DEHUMIDIFIED AIR CONDITIONING

[76] Inventor: Milton Meckler, 930 20th St. #2, Santa Monica, Calif. 90403

[21] Appl. No.: 16,152

[22] Filed: Feb. 5, 1993

Related U.S. Application Data

[63] Continuation-in-part of Ser. No. 726,040, Jul. 5, 1991, Pat. No. 5,191,771.

[51] Int. Cl.⁵ ............................................. F25D 23/00
[52] U.S. Cl. .......................................... 62/271; 62/94
[58] Field of Search ................. 62/271, 324.5, 332, 62/311, 94

[56] References Cited

U.S. PATENT DOCUMENTS

| | | | |
|---|---|---|---|
| 2,182,453 | 12/1939 | Sellew | 62/271 |
| 4,941,324 | 7/1990 | Peterson et al. | 62/94 |
| 4,981,021 | 1/1991 | Assaf | 62/271 |
| 5,020,334 | 6/1991 | Wilkinson | 62/271 |
| 5,022,241 | 6/1991 | Wilkinson | 62/271 |
| 5,189,884 | 3/1993 | Sami | 62/114 |
| 5,191,771 | 3/1993 | Meckler | 62/271 |

Primary Examiner—Henry A. Bennet
Assistant Examiner—William C. Doerrler
Attorney, Agent, or Firm—William H. Maxwell

[57] ABSTRACT

A liquid polymer-salt solution as a desiccant in an air conditioning system comprised of a heat-pipe having its heat absorber section in an outside air inlet duct following water vapor adsorption into the desiccant by a contacter section of a dehumidifier, and the heat-pipe having its heat rejecter section in an exhaust air duct and preferably preceeding water vapor discharge from the desiccant by a regenerater section of the dehumidifier.

18 Claims, 5 Drawing Sheets

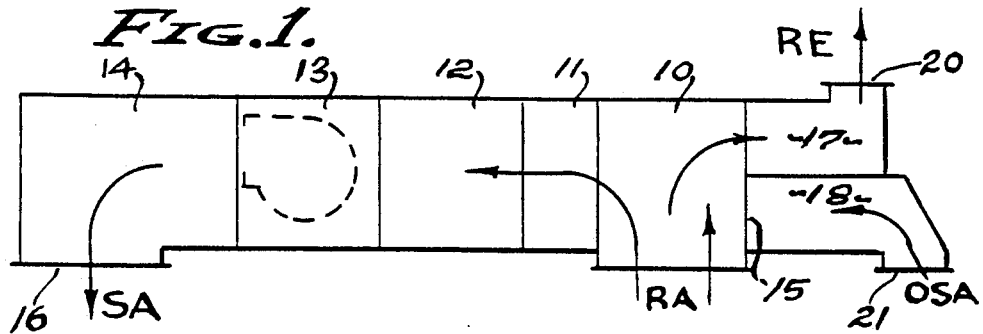
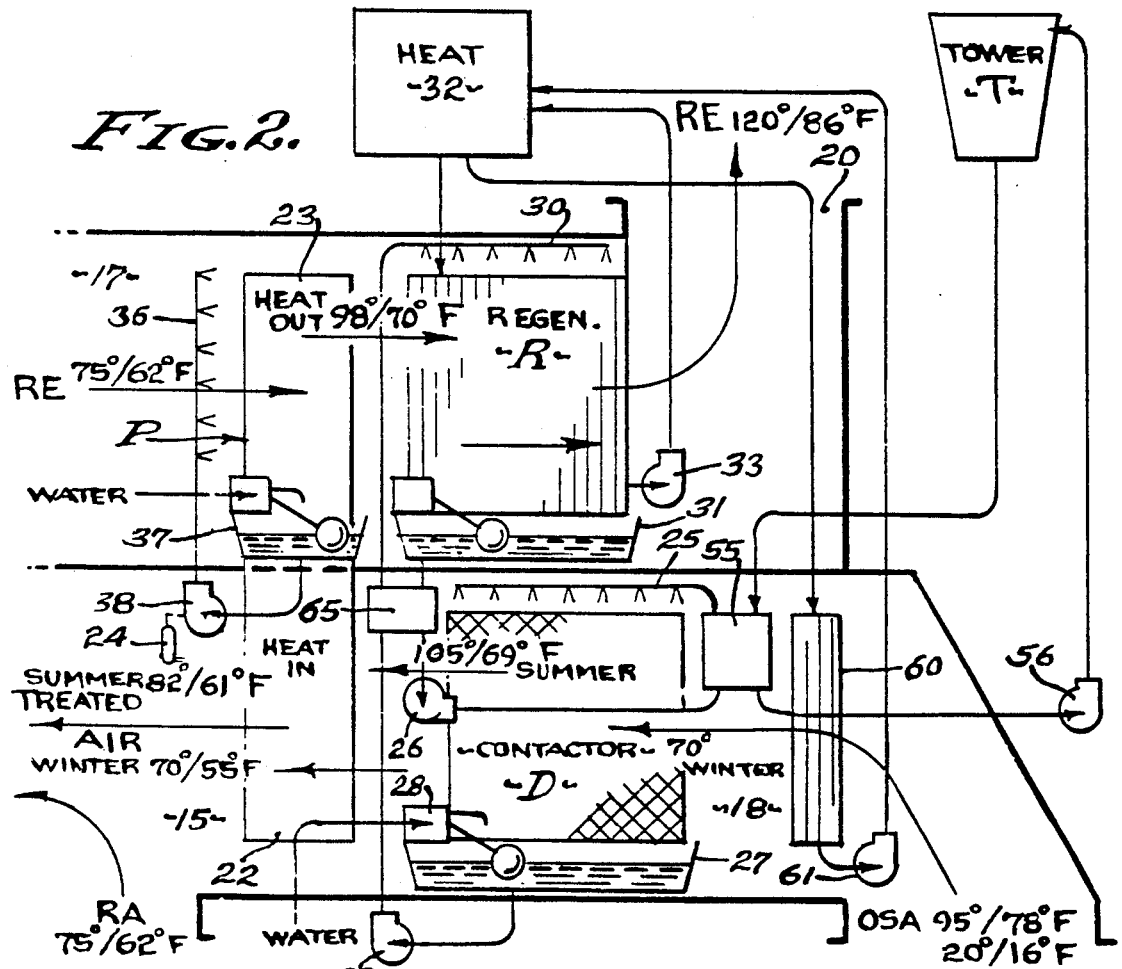
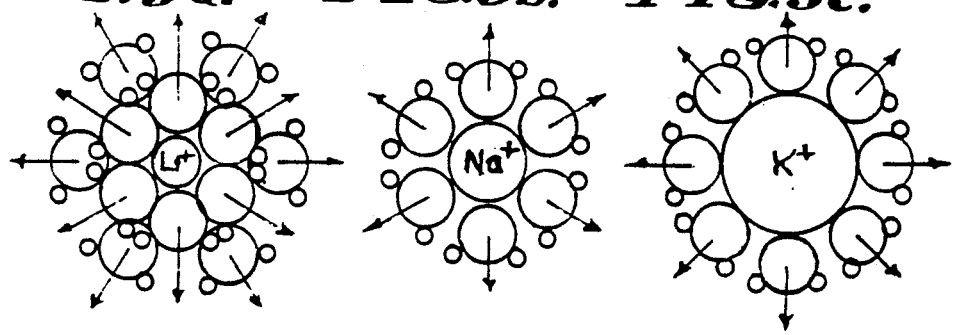

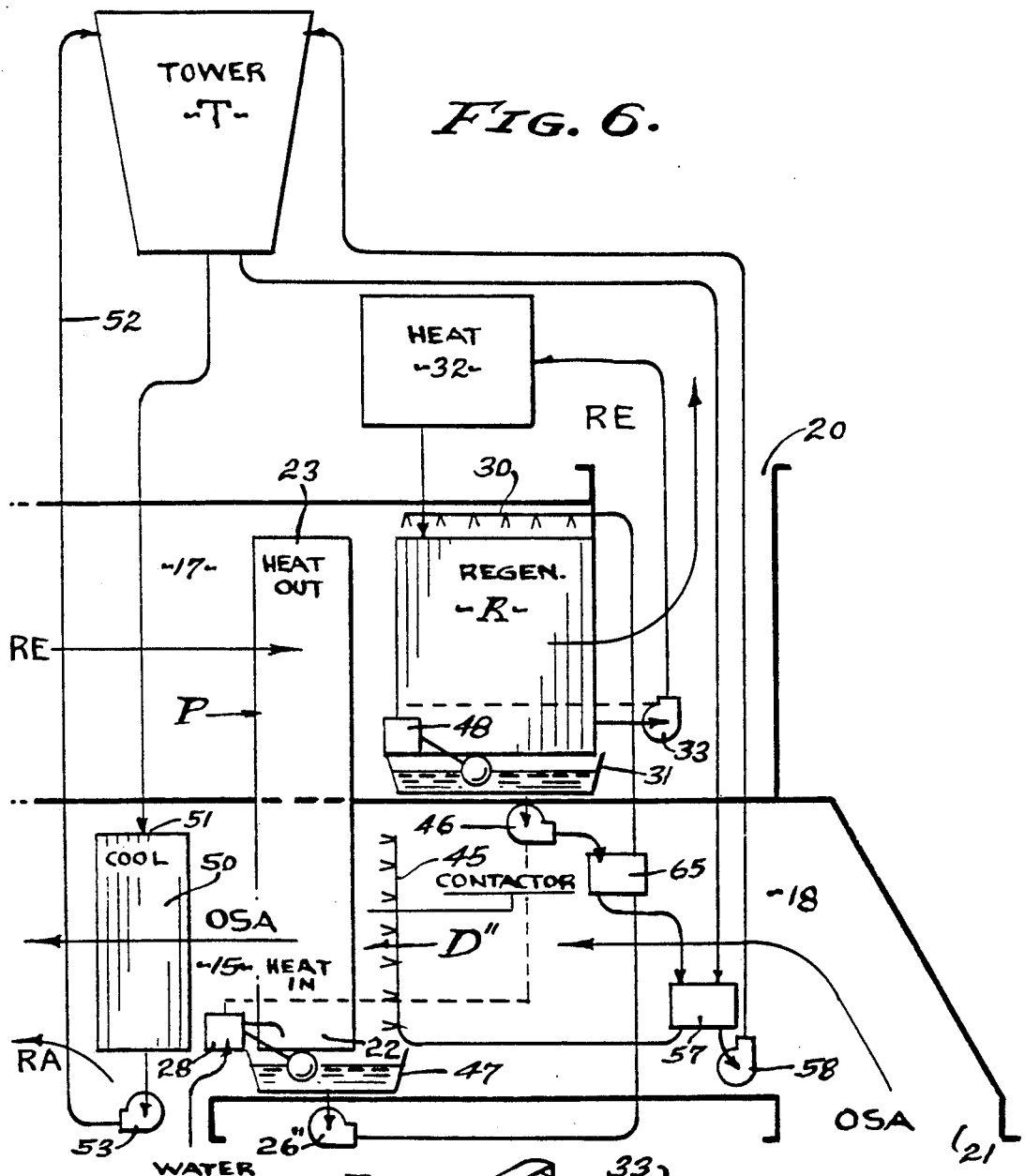
FIG. 6.
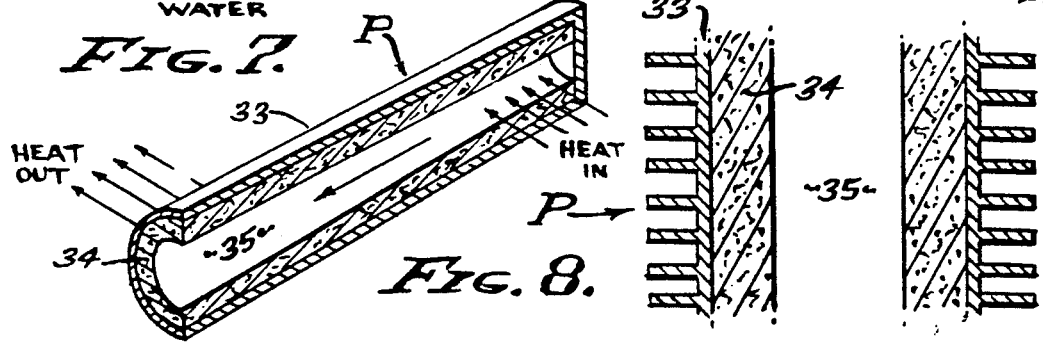
FIG. 7.
FIG. 8.

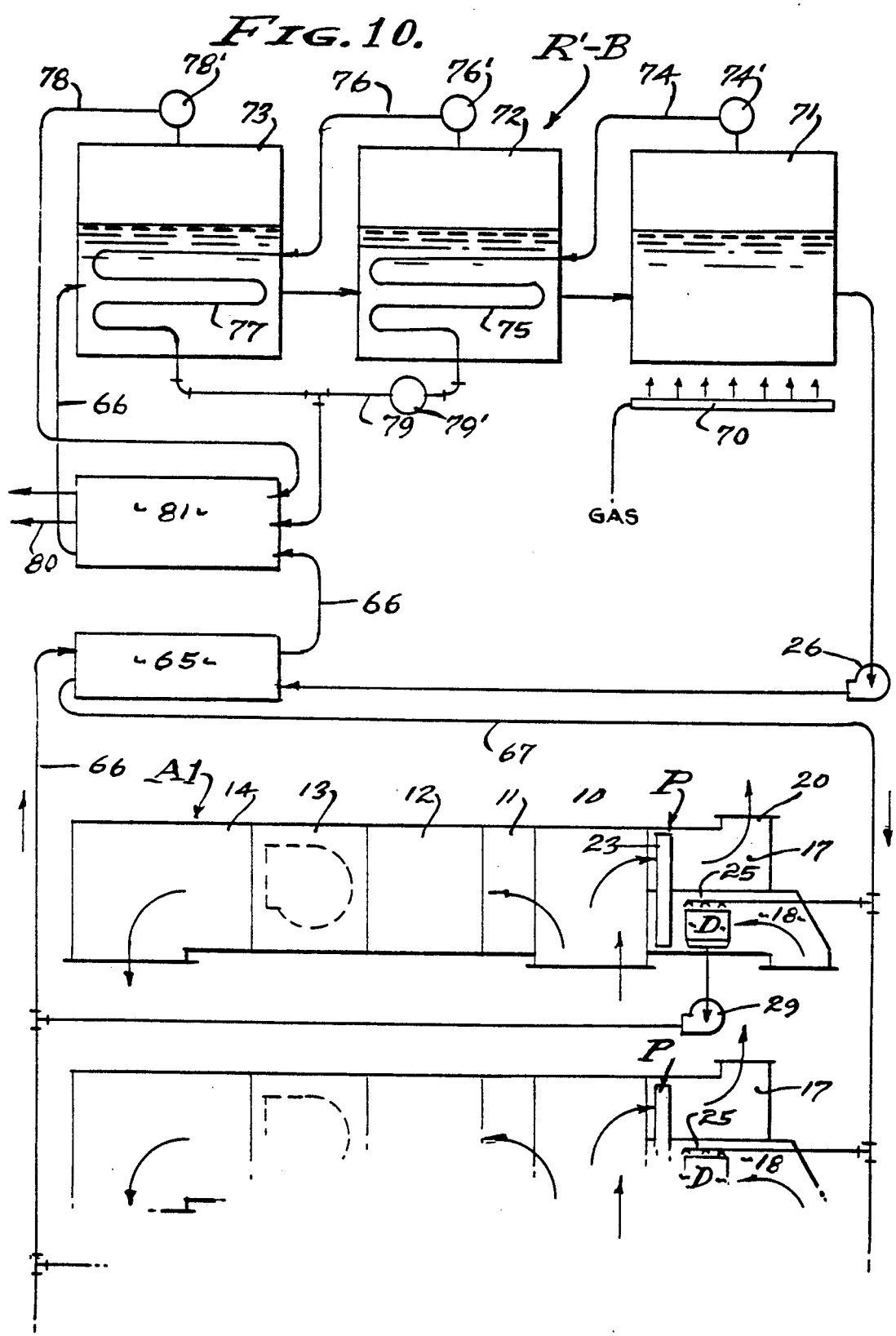

POLYMER DESICCANT AND SYSTEM FOR DEHUMIDIFIED AIR CONDITIONING

This is a continuation in part of application Ser. No. 07/726,040 filed Jul. 5, 1991, entitled *POLYMER DESICCANT AND SYSTEM FOR DEHUMIDIFIED AIR CONDITIONING*, now U.S. Pat. No. 5,191,771.

BACKGROUND OF THE INVENTION

This invention relates to air conditioning wherein the intake of outside air is dehumidified. Heretofore, the desiccants employed have been expensive and because of their corrosive nature the dehumidifying section of air conditioning equipment has been fabricated of exceedingly expensive corrosive resistant materials, for examples calcium chloride or lithium chloride desiccants employing copper-nickel steel equipment is the usual requirement. Accordingly, it is a primary object of this invention to provide a relatively inexpensive and less corrosive desiccant, and a desiccant that is economically effective and which is adapted to use in relatively inexpensive equipment made of commercial grade materials such as steel that is protectively coated as by a paint or sealant, plating, or galvanizing and the like. It is cost effective dehumidification which is an object of this invention, all of which is accomplished without change to the downstream refrigeration and/or heating equipment.

There are a number of materials known to be useful as desiccants and particularly polymers proposed to be used as solids adapted to absorb water and to be regenerated as by drying for repeated use. However, the use of solid desiccant involves equipment implementation that can become bulky and oversized due to the nature of volume increase by the cube of the structural dimensions. With solid polymer the composition of the desiccant in a substrate is fixed. Therefore, the water uptake is dependent only upon temperature. However, with an aqueous polymer solution the liquid concentration can be variable, so that the water uptake is controllable, since the vapor pressure, concentration and temperature are all adjustable so as to maximize their functions. It is therefore an object of this invention to avoid objectionable size increase in the equipment by employing liquid polymers which avoid the same as capacity requirements increase, since they are fluid and are therefore more versatile in their applications. Such polymers which are feasible to be used as packed desiccants are:

Polystyrene sulfonic acids sodium salt
Polyacrylic acid ammonium salt
Poly (methacrylic acid) sodium salt
Poly (n-vinylacetamide vinyl sulfonate) sodium salt
Polyacrylic acid sodium salt
Cellulose sulfonate sodium salt
Methyl cellulose However, it is a liquid desiccant of polymer material with which this invention is concerned, and to this end it is an object to provide the same in the form of hygroscopic fluids as a desiccant, rather than in the form of solid salts.

Water vapor sorption by polymers is a recognized advantage, however there is criticality involved in the salt to be employed therewith, the water uptake capability being most important. The ion-dipole interaction is therefore to be considered, reference being made to FIGS. 3a, 3b and 3c of the drawings, which illustrate the comparisons between the use of Lithium, Sodium and Potassium. It becomes apparent that the Lithium ion Li+ accommodates a far greater amount of water, of the three, due to its small cationic size as compared with either Sodium Na+ Potassium K+. The atomic weight and corresponding cationic size of various elements are considered, as follows:

| Li | Lithium | 6.9 |
|----|---------|-----|
| Na | Sodium | 23 |
| K | Potassium | 39 |
| Ca | Calcium | 40 |
| Ca | Cesium | 133 |

Therefore, it is an object of this invention to employ any one of the known salts in the sulfonation of the aforementioned polymers to be employed in a liquid form as a hygroscopic liquid, especially as a desiccant. Accordingly, Polystyrene Sulfonic Acid Lithium Salt Solution or PSSALS is a preferred embodiment herein (see FIG. 5b).

It is an object of this invention to implement the advantages of a polymer-salt solution in dehumidification equipment, as a low cost unit or section of equipment applicable to existant refrigeration air conditioning equipment, without major change thereto. Air conditioning involves generally, an outside air supply, a supply air discharge into a building interior, return air intake from the building interior, and a relief air discharge. The polymer-salt solution dehumidifier of the present invention is adapted to the outside air intake and to the relief air discharge of the existent air conditioning equipment. It is an object of this invention to advantageously employ the outside supply air intake temperature for desiccant treatment. It is also an object of this invention to advantageously employ a heat-pipe to extract heat after dehumidifier intake section herein disclosed replaces an air intake or power section of usual equipment and is preferably attached to a blower section unit that separates the relief air from the return air, as shown.

An air conditioning system involves the discharge of relief air that is replaced by outside supply air. The volume ratio of these two columns of air varies as a result of variations in leakage from the conditioned air spaced involved, the relief air being stale interior air retrieved at a place or places of higher interior temperature and where stale air exists. Consequently, relief air is substantially warmer than supply air (the conditioned air), it being an object of this invention to advantageously employ warmer relief air before its discharge as exhaust air, by dissipating its usable heat energy through the regenerater section of the dehumidifier. It is still another object of this invention to advantageously employ the heat energy rejected by the heat pipe, or pipes, for this purpose, as disclosed in each of the embodiments of this invention as later described.

In a second embodiment of this invention, FIG. 4, the adsorption element of the dehumidifier is a heat exchanger over which the polymer-salt solution is wetted and through which a coolant is circulated for reduced temperature intake air into the air conditioning equipment. In practice, the coolant is controlled and circulated by a pump, over or through a heat exchanger, and chilled or cooled as by means of an evaporative cooling tower (employing water). The heat-pipe relationship remains the same as in the first embodiment.

In a third embodiment of this invention, FIG. 6, the adsorption element of the dehumidifier is the absorber section or hot end of the heat-pipe and over which the polymer-salt solution is wetted for water vapor sorption and through which the heat-pipe refrigerant recirculates for heat absorption. There is a simultaneous heating effect and cooling effect on the outside supply air, said air being heated as a result of the water vapor sorption by the polymer-salt solution while being cooled as a result of heat adsorption by the hot end of the heat-pipe. It is to be understood that the use of a hygroscopic desiccant liquid involves regeneration through the application of heat, which is shown herein generally as a supplemental heat source, all according to state of the art processes. In accordance with this invention, regeneration is by means in the discharge of relief air over the heat rejector section or cold end of the heat-pipe.

In a fourth embodiment of this invention, FIG. 9, a central regenerater unit services a multiplicity of dehumidifier contactor sections. That is, a multiplicity of dehumidifier means, each serving an independent air conditioning unit, commingles weakened desiccant to be strengthened by a single regenerater section or unit. This combination reduces the complexity of the dehumidifier means operable with each air conditioner unit, and makes possible the use of a larger most efficient regenerater unit for cost efficient operation.

In a fifth embodiment of this invention, FIG. 10, the regenerater section is a self contained and self operable unit wherein heat is the prime mover directly applied to the water saturated desiccant without resort to contact with blower motivated air. Reference is made to the polymer-salt desiccant solution disclosed herein as the preferred hygroscopic liquid for the adsorption of water vapor. This preferred desiccant is known to be more viscous than the usual prior art desiccant such as Lithium Chloride, and through spray bar distribution is practical in the contacter section of a dehumidifier means, regeneration by means of spray bar and interface heat application presents liquid handling problems, because of the higher viscosity. It is an object of this invention, therefore, to directly process the weakened higher viscosity desiccant through a multi effect boiler concentrater, using the direct application of heat in a first high pressure stage followed by at least one or more lower pressure stages and with a counter flow of desiccant from which water vapor is driven out of the weakened water saturated liquid and returned to the contacter section or sections as strengthened desiccant.

SUMMARY OF THE INVENTION

A polymer-salt solution is provided as the desiccant in the form of a hygroscopic liquid than can be processed and transported most efficiently in cost effective dehumidification equipment. There are a number of salts that may be used in the formation of the desiccant provided, preferably one of small cationic size such as Lithium, Sodium or Potasium. The polymer materials do not vaporize and are reasonably stable for the purpose intended, and they are sulfonated and retained in solution and liquid state for transport between and effective processing at the contacter section and regenerate section of the dehumidifier. The preferred desiccant is sulfonated Lithium, for its small dipole configuration as illustrated in FIG. 3a of the drawings, a cost effective material that is, for example, approximately two thirds the cost of a comparable aqueous Lithium Chloride solution, when prepared for the purpose under consideration. And, by employing a polymer-salt solution as specified herein, corrosive effect upon the equipment is minimized to the extent that cost effective materials can now be used in their construction. Accordingly, commercial grade low cost materials can be used to replaced high grade cooper-nickel materials.

The aforesaid employment of polymer-salt solutions for dehumidification is advantageously combined herein with the function of heat-pipe means, in a system that has no adverse effect on the outside air intake to the downstream air conditioning equipment, but rather a beneficial effect. A feature of this invention is that the dehumidified air discharge is through heat-pipe means that removes heat added to the outside intake air in the preceeding process of adsorption. Another feature of this invention is the use of relief air discharge over the heat rejecter portion of the heat-pipe means whereby heat energy in the relief air is advantageously employed and supplemented by a controllable heat source to operate the regenerater section of the dehumidifier.

It is still another object of this invention to combine a dehumidifier and a heat-pipe for simultaneous dehumidification and heat rejection from outside intake air, ahead of refrigeration or heating by downstream equipment. In accordance with this invention, the heat absorber section of the heat-pipe means serves as the adsorption section of the dehumidifier, its heat transfer surface being wetted with the desiccant, preferably with the sulfonated Lithium solution as described. In the summer mode of operation, outside dehumidified air is pre-cooled. In the winter mode of operation, outside dehumidified air is permitted to add heat through inherent reversal of the heat-pipe. The downstream air conditioning equipment operates in either the summer of winter mode.

The regeneration of weakened desiccant can be conducted on a unit basis with a regenerater section assigned to each contacter section, or on a central service basis with a common return to and supply from a remoted regenerate unit of most efficient design. Further, a most significant feature of this invention is the higher viscosity of the polymer-salt solution used as the desiccant, wherein a direct multi stage boiler regenerater section or unit is most efficient, thereby eliminating the usual prior art liquid to air interface contact for vaporization and water vapor discharge.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a longitudinal side elevation illustrating the system of the present invention, with the dehumidifier section installed ahead of a downstream air conditioner.

FIG. 2 is an enlarged diagram showing a first embodiment wherein a heat-pipe reduces outside intake air temperature and utilizes the discharge of inside relief air.

FIGS. 3a, 3b and 3c illustrate the comparison in the cationic size of Lithium, Sodium and Potassium ions, the preferred salts use herein to form the polymer-salt solution as a desiccant.

FIG. 6 is a diagram similar to FIGS. 2 and 4, showing a third embodiment, wherein the contacter section of the dehumidifier is combined with the heat absorber section of the heat-pipe, and with heat rejection into the relief air that is exhausted through the regenerator section of the dehumifier.

FIG. 7 is a perspective fragmentary section of a heat-pipe configuration as it is employed throughout this disclosure.

FIG. 8 is a sectional view showing the finned feature of the heat-pipe for efficient heat transfer.

Figure 4:
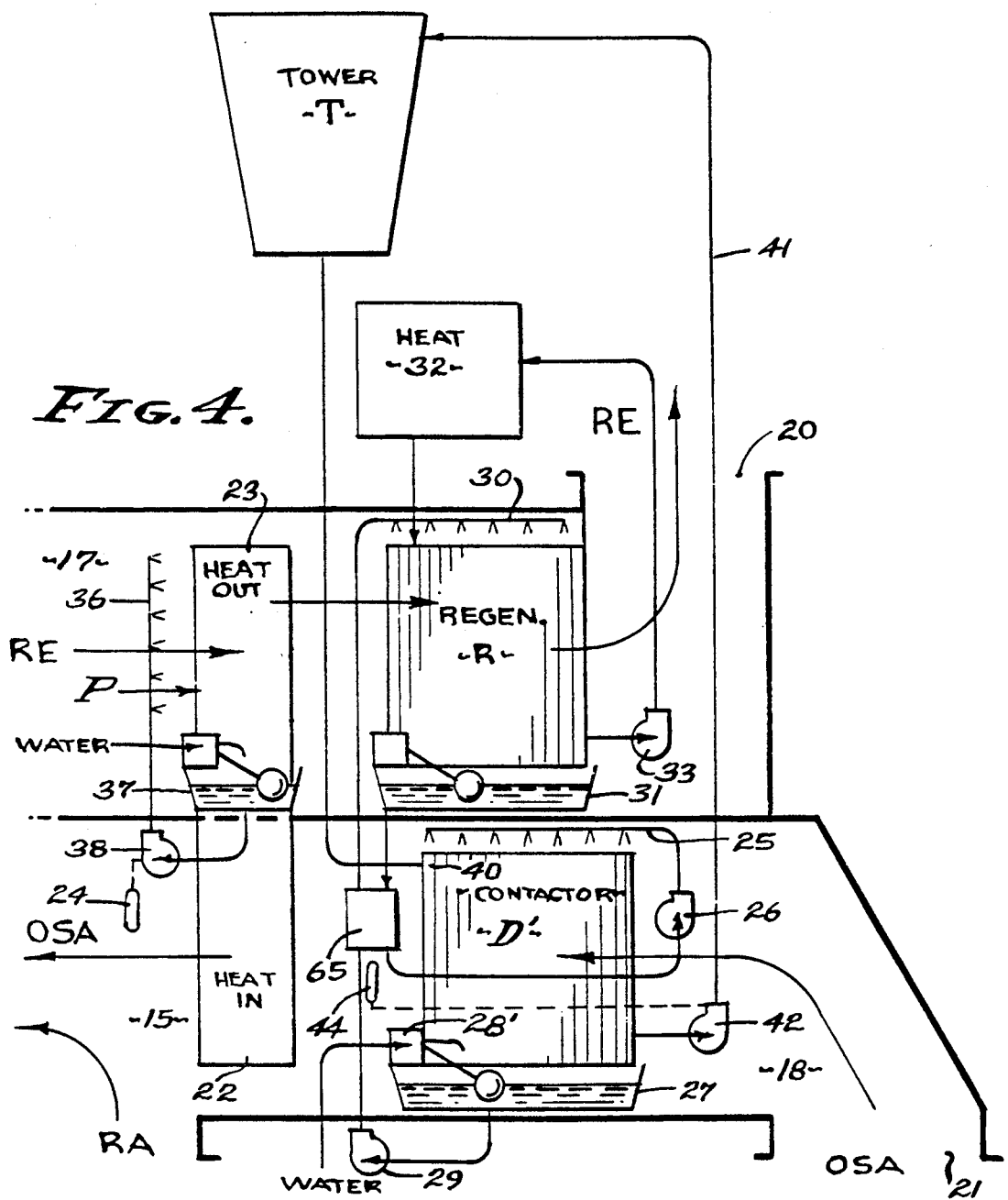
FIG. 4 is a diagram similar to FIG. 2, showing a second embodiment, wherein the adsorption section of the dehumidifier is a heat exchanger that cools the outside intake air.
Figure 5A:
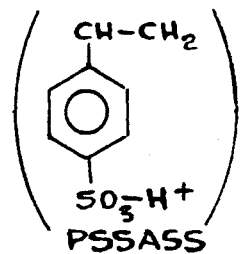
FIG. 5a and 5b are diagrams that illustrate Hydrogen and Lithium anionic polymers, respectively.
Figure 5B:
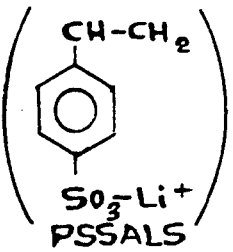

And FIG. 10 illustrates a desiccant regeneration multi stage boiler servicing at least one or more downstream air conditioning systems or units, and each of which has a contacter section for dehumidifying incoming outside air.

PREFERRED EMBODIMENTS

Referring now to the drawings, FIG. 1 illustrates typical refrigeration air conditioning equipment comprised of a power return section 10, a filter section 11, a coil section 12, a blower section 13, and a diffuser and final filter section 14. The necessary refrigeration compressor and condenser (not shown) are included in the coil section 12, or they are external. The power section 10 is preferably a blower section that includes means that separates return air RA into recirculated supply air SA which is supplemented by incoming outside air OSA air and into relief air RE which is exhausted to outside atmosphere. That is, a portion of the conditioned interior air is discharged as relief air RE, and it is replaced by new incoming outside air OSA. In practice, the discharge temperature of incoming outside air OSA into the power return section 10 is proximate to the outside air temperature, while the discharge temperature of relief air is that of the warmer interior air. The sections 10–14 discharge supply air SA into the conditioned interior at a temperature set by thermostat control means (not shown). The downstream air conditioning equipment is state of the art, having an intake duct at 15 to receive dehumidified outside air, and a discharge duct 16 to deliver conditioned supply air into a building structure. The power return section 10 is in open communication with the intake duct 15 and receives dehumidified outside air OAS therefrom. The power section 10 is characterized by damper means or the like (not shown) that separates a portion of the return air for discharge to atmosphere via a discharge duct 17 corresponding in capacity to an intake duct 18 (see FIG. 1), ducts 17 and 18 opening at the interface of power section 10 with the dehumidifier contactor D and regenerator section R later described.

In accordance with this invention, the structure of the dehumidifier sections are of commercial grade materials that require the desiccant to be substantially non-corrosive, and to this end I have provided a polymer-salt solution in the form of a hygroscopic liquid. As specified above, there are a number of elements and their atomic weights to be considered, and among which are the following:

| Li | Lithium | 6.9 |
| Na | Sodium | 23 |
| K | Potassium | 39 |
| Ca | Calcium | 40 |
| Cs | Cesium | 133 |

These materials when added to the anionic polymer solutions, as described herein, will vary in their corrosiveness, it being determined that some are well within tolerance for contact with commercial grade materials such as steel that is protectively coated as by a paint or sealant, plating, or galvanized and the like, without undue corrosive action. The selected material or element is also selected for its cationic size (see FIGS. 3a, 3b and 3c), a material having the smaller ion size being preferable in order to accomodate a greater number of water clusters in surrounding hydration spheres, as is illustrated. Accordingly, Lithium Li is preferred, since its atomic weight and cationic size are very small, and because its corrosiveness is known to be tolerable when using the commercial grade materials specified herein. For a comparison, Helium H has a lower atomic weight of one (1) and therefore a smaller cationic size, but when sulfonated into a salt solution its corrosive action is intolerable for a cost effective structure of the type under consideration.

Present commercially available polymers are as follows:

| Polystyrenesulfonic acid lithium salt | PSSALS |
| Polystyrenesulfonic acid sodium salt | PSSASS |
| Polyacrylic acid ammonium salt | PAAAS |
| Poly(methacrylic acid) sodium salt | PMAASS |
| Poly(vinylacetamide, vinyl sulfonate) sodium salt | PVAVSSS |
| Polyacrylic acid sodium salt | PAASS |
| Cellulose sulfate sodium salt | CSSS |
| Methyl cellulose | MC | solutions have suitable sorption, adsorption and stability properties.

In addition to the aforementioned polymer solutions as desiccants, there are the following AMPSASS solutions which suitable desiccant properties:

| Polysodium methacrylate copolymer | AMPSASS |
| Polyacrylamide sodium hydrogel AMPSASS | AMPSA |
| Polyvinylbenzyltrim ammonium chloride | PVBTAC |
| n-Vinylpyrrolidone dimethylaminoethyl methylcrylate copolymer | AMPSASS |
| Polydimethyl acrylamide copolymer | AMPSALS |
| Polysodium acrylate copolymer | AMPSAKS | solutions having suitable sorption, adssorption and stability properties.

State of the art liquid polymer materials in their acid forms, for example, are enhanced as desiccants having suitable sorptive, adsorptive and stability properties. These are PSSALS and PNVSLA materials which are not yet routinely used, but which are enhanced in their moisture carrying capacity by adding soluble or insoluble solid compounds from the glycol family, such as:

Tri ethylene glycol
Tetra ethylene glycol
Penta ethylene glycol
Neopentyl glycol
Penta erythritol Solids additives to the foregoing glycols to enhance their liquid carrying capacity are materials such as:
Fructose
Silica gel
Alumina silicates
Polystyrene sulfonic acid lithium salt (PSSALS)
Poly n-vinylacetamide vinyl sulfonate lithium salt (PNVSLA)

According to the foregoing, the preferred desiccant is presently sulfonated Lithium $SO_3Li$, PSSALS in a solution and at viscosity that can be pumped and sprayed within a heat range of 80° F. to 225° F. db. The sorption properties of this Lithium polymer-salt solution is substantial and cost effective and provides a non-vaporizing desiccant that is reasonably stable.

Referring now to the first embodiment and to FIG. 2 of the drawings, the dehumidifier or contacter section D is a means that involves both the aforesaid relief air discharge duct 17 and the air intake duct 18, these two ducts being of substantially the same air flow capacity, as shown. Discharge duct 17 exhausts relief air RE to atmosphere at 20, while the separate and essentially parallel duct 18 receives outside air OSA at 21. In accordance with this invention, there is adsorption means for removal of water from the outside air OSA flowing therethrough, and there is a heat-pipe means P for removing heat from the outside air OSA entering through the duct 18 and for rejecting said heat into the relief air RE exhausting through the duct 17. Accordingly, the heat absorber section 22 of the heat-pipe means P follows the dehumidifier contacter section D in the flow of outside air OSA from the entry at 21 to the downstream discharge at duct 15. And, the heat rejecter section 23 of the heat-pipe means P preceeds a regenerater section R of the dehumidifier means.

The dehumidifier contacter section D heats the incoming outside air OSA as a result of the desiccant adsorption of water vapor, following which said outside air is cooled by the heat absorber section 22 of the heat-pipe means P. In the first embodiment of FIG. 2, the dehumidifier contacter section D is of the packed desiccant wetted type, through which a column of outside air OSA is passed for intimate contact with the hygroscopic desiccant liquid solution. A distribution means or spray bar 25 supplied with strong polymer-salt solution desiccant from a pump 26 wets the pack through which the air column flows. A sump 27 collects the fall of weak liquid desiccant from the packing, and from which the desiccant is recirculated to a regenerater means R by a pump 29. The desiccant supply is subject to depletion due to evaporation of its water content when operated in the humidification mode, and it is replenished by a float control valve 28 supplied with make-up water, as shown.

The regenerater means or section R processes weak moisture laden desiccant collected by the sump 27, removing the adsorbed water therefrom, shown herein as a desiccant wetted heat exchanger operated through the application of heat from a controlled heat source means 32, the pump 29 delivering water laden desiccant thereto by means of a spray bar 30 or like means. A sump 31 collects the fall of regenerated liquid desiccant from the heat exchanger and from which it is returned to the dehumidifier contacter section D via the pump 26. The controlled heat source means 32 is shown in a closed circuit through the heat exchanger of the regenerater means R, and can be any suitable heat source such as a boiler or the like. A pump 33 recirculates a liquid heating fluid (water) while applying supplemental heat as may be required, in addition to the heat rejected into the relief air RE through the rejecter section 23 of the heat-pipe as will be described. In practice, and for example, heat of compression can be withdrawn from the refrigeration compressor as by means of a heat exchanger (not shown), or by any equivalent source of heat associated with the compressor or section 12.

The heat-pipe means P cools the incoming outside air OSA discharged by the dehumidifier contacter section D, by absorbing heat therefrom at its heat absorber section 22, and it heats the outgoing relief air RE by rejecting heat at its heat rejecter section 23. Accordingly, the heat absorber section 22 is in the duct 15 following contacter D while the heat rejecter section 23 is in the duct 17 preceeding the regenerater section R. The heat-pipe means P is characterized by a hot end for absorption of heat and by a cold end for rejection of heat. In other words, there is a "heat in" end and a "heat out" end, for the normal summer cooling mode, which is inherently reversed for the normal winter heating mode. In carrying out this invention, the cold "heat out" rejecter section 23 is placed in the relief air RE and exhaust duct 17, and the hot "heat in" absorber section 22 is placed in the outside air OSA inlet duct 18. A feature of this invention is that the heat absorber section 22 follows the dehumidifier contacter section D, while the rejecter section 23 preceeds the regenerator section R. Accordingly, there is a heat transfer function that occurs between and from duct 18 to duct 17, so as to reduce the induction air temperature after dehumidification by the desiccant, and to increase the relief air RE temperature prior to its employment in regenerating the desiccant. In practice, transfer of heat energy from the incoming column of OSA air to the outgoing column of RE air is by means of a multiplicity of heat-pipe tubes, the cold end sections 23 in the form of heat dissipaters placed in the duct 17 ahead of the regenerater means and the hot end sections 22 in the form of heat absorbers placed in the duct 18 following the dehumidifier means.

In accordance with this invention, the heat-pipes P are lengths of heat conductive tubing 33 sealed at their opposite ends, having interior fitting tubular wicks 34, and charged with a fluid refrigerant 35, a temperature responsive liquid-to-gas fluid (see FIG. 7). A temperature differential between the ends of each pipe causes the fluid refrigerant to migrate in its liquid state by capillary action to the warmer end where evaporation to its gaseous state takes place and thereby absorbs heat. The resultant gaseous refrigerant vapor then returns through the hollow of the tube, where it gives up the heat carried thereby, by condensing into the wick in order to repeat the cycle. The heat transfer process is efficient, since the heat pipes are sealed and have no moving parts, and therefore require little or no attention. The heat-pipes are finned for most efficient heat energy transfer.

In accordance with this invention, control of the heat-pipe means P involves evaporative cooling of the heat rejecter section 23 thereof as and when required, to increase the cooling effect of the heat absorber section 22. As shown, a spray bar 36 supplied with an evaporative liquid such as water from a sump 37 by a recirculating pump 38 wets the finned air contacting exterior of the heat rejecter section 23 of the heat-pipe. In practice, the evaporative liquid is cold make-up water that has a sensible cooling effect as well as an evaporative cooling effect. A thermostat 24 senses temperature as a control means that determines cooling requirements.

Referring now to the second embodiment and to FIG. 4 of the drawings, the dehumidifier means D' differs from the first embodiment in that it is of the heat exchanger type through which a coolant is circulated to reduce the desiccant temperature. The ducting 17, 18, 20 and 21 remain the same, and the heat-pipe means P is unchanged and operates as above described, with control by means of sensible and/or evaporative cooling. In practice, a finned air coil type through flow liquid contact exchanger is employed, with a cold water inlet 40 from a cooling tower T, and a return line 41 through a pump 42 to the tower. Accordingly, the desiccant temperature is controlled and/or reduced as may be required, as by means of a thermostat 44 that senses temperature as a control means that determines cooling requirements. Desiccant is supplied from sump 31 by the pump 26, and the regenerater means R and heat-pipe means P are all as hereinabove described, so as to control desiccant temperature as circumstances require.

Referring now to the third embodiment and to FIG. 6 of the drawings, the dehumidifier contacter section D" differs from the first and second embodiments in that it is combined with the heat absorber section 22 of the heat pipe means P. The hot heat absorber end section 22 of the heat-pipe functions as a dehumidifier by being sprayed with desiccant from a spray bar 45 supplied by a pump 46 drawing desiccant from the sump 31. The spray bar 45 is vertically disposed as shown, rather than horizontally as in the first and second embodiments. Accordingly, the pump 46 replaces the pump 26, a sump 47 replaces the sump 27, a spray bar 45 replaces the spray bar 25, all as shown in the drawings. The ducting 17, 18, 20 and 21 remain the same, and the heat-pipe means P is the same except for its incorporation with the dehumidifier D" as hereinabove described. In carrying out this embodiment, the simultaneous functions of water vapor adsorption adding heat, and head adsorption into the heat pipe, involves combined heating and cooling of the desiccant during the process of dehumidification. In order to complete the required cooling effect, I provide a heat exchanger 50 in the air supply duct 15, following the contacter dehumidification step, supplied with cooled water at 51 from the cooling tower T, and with a return line 52 through a pump 53 to the tower. The relief exhaust air RE is discharged to atmosphere from the duct 17 at 20, as shown and above described.

A feature of this invention is the adjusted temperature at the interface of the dehumidifier contacter section D (D' and D"), cooling the actively strong desiccant to an optimum range of temperature conducive to water vapor adsorption. This coolant application moderates the inherent heat rise that results from water vapor adsorption in the desiccant when the outside air OSA is in contact therewith. The second embodiment of FIG. 4 advantageously employs tower water in the dehumidifier contacter section D', a coil or plate type heat exchanger that uses cold tower water to reduce the temperature at the interface of the contacter section with the incoming outside air where water vapor adsorption occurs. In accordance with this invention the advantage of this feature is also provided in the first and second embodiment, by utilizing cooled tower water to lower the temperature of the regenerated desiccant, rather than lowering the interface temperature with incoming air.

As shown in the first embodiment of FIG. 2, cold water from a cooling tower T passes through a heat exchanger 55 and is returned to said tower by a pump 56. This heat exchanger is of the tube or plate type through which the desiccant supply passes to the contacter spray bar 25, to reduce the temperature thereof at the interface of the desiccant with the contacter pad or packing where water vapor adsorption occurs (applicable to FIG. 4 embodiment).

As shown in the third embodiment of FIG. 6, cold water from a cooling tower T passes through a heat exchanger 57 and is returned to said tower by a pump 58. This heat exchanger is of the tube or plate type through which the desiccant supply passes to the contacter spray bar 45, to reduce the temperature at the interface of the desiccant with the finned outside surface of the heat-pipe P. It is the interface temperature of the heat absorber section 22 of the heat-pipe that is adjusted or moderated by cooling the desiccant before it is sprayed onto the contacter fins thereof.

Another feature of this invention is the adjusted temperature at the interface of the dehumidifier contacter section D, heating the incoming outside air OAS to an optimum range of temperature to avoid icing, and to provide heat for humidification when required for the winter mode of operation. As shown in FIG. 2 of the drawings, this is accomplished by providing a liquid to air heat exchanger 60 in the duct 18 ahead of the dehumidifier contacter section D, and supplied with heat from the controlled heat source 32, by a pump 61 in a closed circuit. This application of heat to the incoming outside air has its practical application to prevent icing-up conditions which could be damaging to the dehumidifier means during inclement winter weather. Typical dry bulb-wet bulb temperatures throughout an operational system are shown in FIG. 2 of the drawings. For example, a winter weather condition with outside air OAS at 20°/16° F. will benefit from heat applied through the heat exchanger 60 as shown and described.

Still another feature of this invention, in each embodiment, is the transfer of heat from the regenerated desiccant and into the weakened desiccant that is returned to the regenerator section for strengthening. To this end there is provided a heat exchanger 65 of the tube or plate type through which hot regenerated desiccant flows via pump 26 to the spray bar means 25, and through which cooler weakened desiccant flows via pump 29 to the spray bar means 30. Note that the above described heat exchanger 55 or 57 is in line between the heat exchanger 65 and the spray bar means 25 or 45, following said heat exchanger 65.

Figure 9:
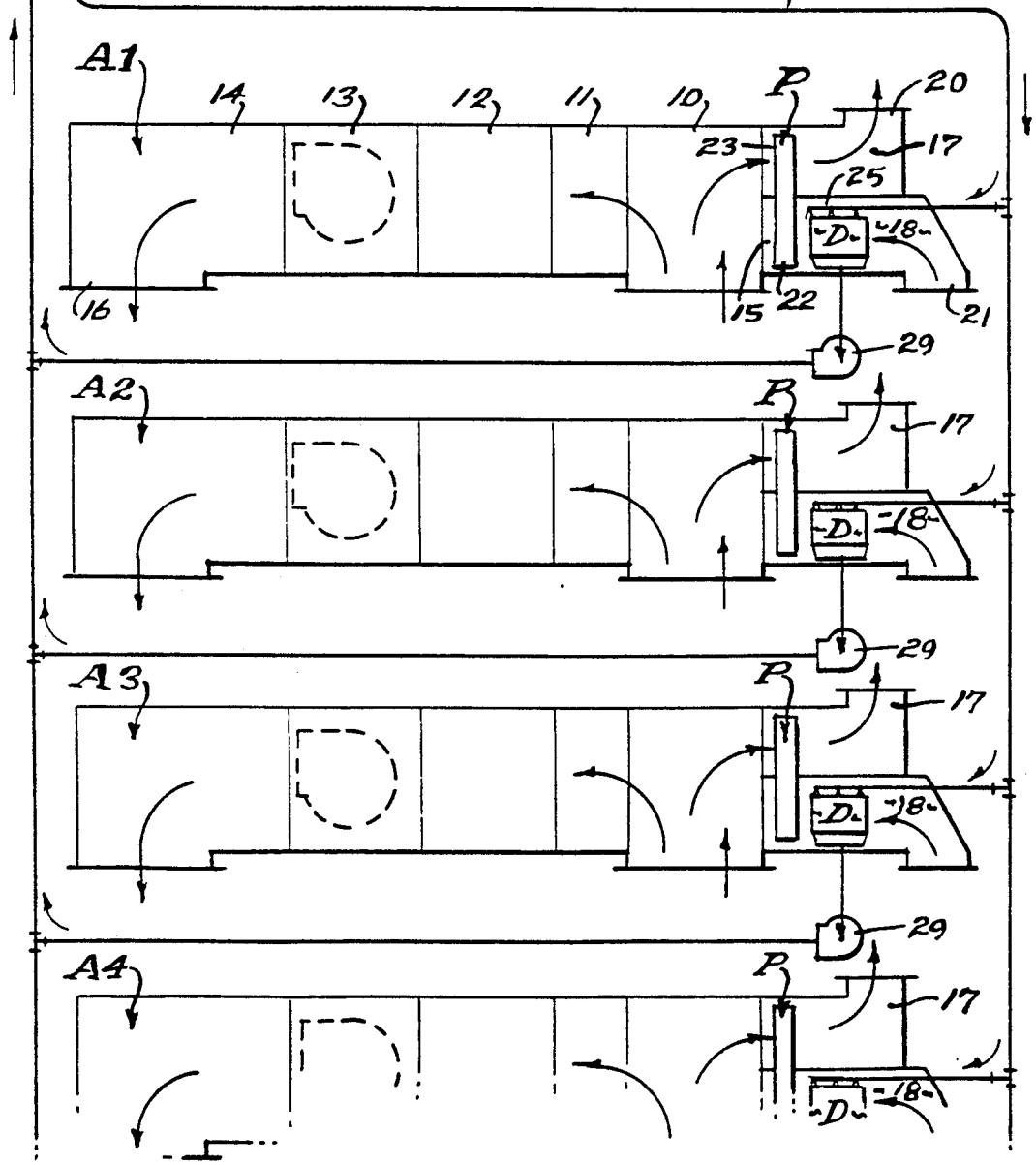
FIG. 9 illustrates a multiplicity of downstream air conditioner units and each preceeded by a dehumidifier section, and wherein the multiplicity of dehumidifier sections is serviced by a central regenerater unit.

Referring now to the fourth embodiment of air conditioner units as shown in FIG. 9 of the drawings, a central regenerater unit R operates to service a multiplicity of air conditioner units A1-A4 as shown to be the same as the air conditioning equipment hereinabove described, and each includes a power section 10, a filter section 11, a coil section 12, a blower section 13 and a diffuser and final filter section 14. And the ducting 15-21 remains the same as above described. It is the regenerater section R of the dehumidifier means D that is removed from the exhaust air discharge duct 17 and remoted as a central service unit (see FIG. 9). Accordingly, only the heat-pipe P operates in the discharge duct 17 of each air conditioner unit A1-A4, for the rejection of heat by the rejecter section 23 thereof. Each dehumidifier section pump 29 returns weakened desiccant to the central regenerater unit R via a common return line 66 and through heat exchanger 65, as determined by independent operation of their respective float controls 28, there being a common supply line 67 from the pump 26 to the spray bar means 25 of each unit A1-A4 (above described).

It is to be understood that this air conditioning system as disclosed herein is primarily for refrigeration and dehumidification of outside air OSA delivered into a conditioned space as supply air SA. However, a reverse situation is satisfied thereby during winter conditions, in which case the demand is for heating and humidification of relatively dry outside air OSA. Accordingly, either or both the dehumidifier means D and heat-pipe P functions are reversed, so that incoming outside air is heater and/or humidified by what has been disclosed hereinabove as a contacter but which can now be operated as a humidifier, and by the inherent reverse function of the heat-pipe P transferring heat from section 23 to section 22. The heat-pipe responds to the external heat differential between its opposite ends. The heat exchange from exhaust duct 17 to inlet duct 18 will vary, and this preceeds the heating function of the air conditioning unit that operates in a heating mode rather than a refrigerating mode.

Referring now to FIG. 10 and the fifth embodiment of a dehumidifier means and a downstream air conditioner system or multiplicity of units, a regenerater section R' operates to service the same in the form of a desiccant regeneration boiler B characterized by pressure decreasing stages that efficiently drive off the unwanted water vapor of adsorption or steam discharged as condensation to atmosphere at low pressure. As shown, a three stage boiler system is provided that will operate at a coefficient of performance (C.O.P.) of approximately 1.6 through the single application of heat to a first stage boiler chamber 71, as by a gas burner means 70 operating, for example, at approximately 40 p.s.i. (or at a heat of vaporization of approximately 934 B.T.U. per Lb.), followed by a second stage boiler chamber 72 operating at approximately 20 p.s.i. (or at a heat of vaporization of approximately 945 B.T.U. per Lb.), and again followed by a third stage boiler chamber 73 operating at approximately 20 p.s.i. (or at a heat of vaporization of approximately 960 B.T.U. per Lb.). By employing the direct multi stage regeneration boiler system as it is disclosed herein, a coefficient of performance of approximately (C.O.P.) 1.6 is realized, as compared to the typical prior art C.O.P. of approximately 0.6.

The first boiler chamber 71 discharges via a line 74 through a heat recovery coil 75 in the second chamber 72. The chamber 72 discharges via a line 76 through a heat recovery coil 77 in the third boiler chamber 73. And, the chamber 73 discharges via a line 78 to atmosphere through one side of a double bundle heat exchanger 81. A manifold 79 collects the condensed discharge from both lines 74 and 76, and which is discharged to atmosphere through the other side of the double bundle heat exchanger 81. The boiler pressures are controlled by pressure regulating means 74', 76', 78' and the manifold 79 by regulation means 79'.

As shown, exhaust of low pressure (16.5 p.s.i.) condensation and/or steam is through the heat exchanger 81 for heat recovery into the weakened desiccant returned by pump or pumps 29 to the regenerater section or unit R' via the return line 66. The supply line 67 from the pump 26 to the spray bar means 25 passes through the heat exchanger 65.

A feature of this boiler system is the counter flow of liquid desiccant sequentially through the heat exchangers 65 and 81, and through the boiler discharge coils 77 and 75 for heat recovery before the application of operating heat by the gas fired means 70. Another feature is the inherent flow of exhaust condensate and/or vapor resulting from an efficient (80% or more) heat energy recover from the multi stage boiler operation.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. An air conditioning system having an outside air inlet duct, a conditioned air supply duct into a conditioned space, a return air duct from said conditioned space and a relief exhaust air duct exhausting return air displaced by outside air and with a blower means to transport said outside, supply, return and relief air, and comprised of:

a heat-pipe having a heat absorber section in the inlet duct for removing the heat of adsorption in the dehumidified inlet air therefrom, and a heat rejecter section in the relief exhaust air duct for applying heat to exhaust air flow therethrough, and an air dehumidifier means for processing a water adsorptive liquid desiccant and having a distribution means for wetting said heat absorber section of the heat-pipe for interface contact of incoming outside air with said liquid desiccant applied thereto to adsorb water vapor therefrom and thereby defining a dehumidifier contacter section, and having a regenerater section in the exhaust air duct following said heat rejecter section for interface contact of relief exhaust air with weakened liquid desiccant from said contacter section and applied thereto by distribution means for removing the heat of adsorption in the dehumidifier air therefrom, and a heat source means applying heat to the regenerater section to remove water from the liquid desiccant and into the exhaust air.

2. The air conditioning system and dehumidifier means as set forth in claim 1, wherein the incoming outside air flows over the heat-pipe absorber section and dehumidifier contacter section for intimate contact with said liquid desiccant regenerated and drawn from the regenerater section, heat of regeneration being removed by heat exchanger means to a cold source.

3. The air conditioning system and dehumidifier means as set forth in claim 1, wherein the regenerater section is a heat exchanger in circuit with the heat source means and wetted with weakened water saturated desiccant from the contacter section and through which outgoing relief exhaust air flows for intimate contact with said liquid desiccant to remove water therefrom by means of heat transferred thereto by the heat exchanger.

4. The air conditioning system and dehumidifier means as set forth in claim 1, wherein the contacter section discharges weakened water saturated desiccant through a heat exchanger and to the distribution means of the regenerater section, and wherein the regenerater section discharges regenerated heated desiccant through said heat exchanger and to the distribution means of the contacter section for heat transfer into and for regeneration of the first mentioned weakened desiccant.

5. The air conditioning system and dehumidifier means as set forth in claim 1, wherein evaporative cooling means wets the rejecter section of the heat-pipe with evaporative liquid for increasing the cooling effect of the heat absorber section thereof.

6. The air conditioning system and dehumidifier means as set forth in claim 1, wherein a heat exchanger in the inlet duct ahead of the contacter section is in circuit with the heat source means to heat incoming outside air to an optimum range of temperature for humidification and to deter icing conditions.

7. An air conditioning system comprised of a multiplicity of independently operable air conditioner units and each having an outside air inlet duct, a conditioned air supply duct into a conditioned space, a return air duct from said conditioned space and a relief exhaust air duct exhausting return air displaced by outside air and with a blower means to transport said outside supply, return and relief air, and each unit including:

an air dehumidifier means for processing a water vapor adsorptive liquid desiccant and having a contacter section in the inlet duct for interface contact of outside air with said liquid desiccant applied thereto by a distribution means to adsorb water vapor therefrom and thereby weakening the desiccant, and a heat-pipe having a heat absorber section in the inlet duct following said contacter section for removing the heat of adsorption in dehumified air therefrom, and a heat rejecter section in the relief exhaust air duct, there being a regenerater section in an outside air transfer duct to remove said adsorbed water vapor from said weakened desiccant from the contacter sections of the multiplicity of conditioner units and returned thereto by said distribution means thereof, blower means to transport said outside air through transfer duct and through said heat transfer means therein, and a heat source means applying heat to said heat transfer means for said removal of said water vapor from the liquid desiccant.

8. The air conditioning system and dehumidifier means as set forth in claim 7, wherein the multiplicity of contacter sections discharge weakened water saturated desiccant through a heat exchanger and to the distribution means of the regenerater unit, and wherein the regenerater unit discharges regenerated heated desiccant through said heat exchanger and to the distribution means of the multiplicity of contacter sections for heat transfer into and for regeneration of the first mentioned weakened desiccant.

9. The air conditioning system and dehumidifier means as set forth in claim 7, wherein evaporative cooling means in at least one of said multiplicity of air conditioner units wets the rejecter section of the heat-pipe with evaporative liquid for increasing the cooling effect of the heat absorber section thereof.

10. The air conditioning system and dehumidifier means as set forth in claim 7, wherein a heat exchanger in at least one of said multiplicity of conditioner units is in the inlet duct ahead of the contacter section and is in circuit with the heat source means to heat incoming outside air to an optimum range of temperature for humidification and to deter icing conditions.

11. The air conditioning system and dehumidifier means as set forth in claim 7, wherein the incoming outside air flows through the wetted contacter section of each of the multiplicity of air conditioner units for intimate contact with said liquid desiccant regenerated and drawn from the regenerater unit, heat of regeneration being removed by heat exchanger means to a cold source.

12. The air conditioning system and dehumidifier means as set forth in claim 7, wherein the regenerater unit is a heat exchanger in circuit with the heat source means and wetted with weakened water saturated desiccant from the contacter sections of the multiplicity of air conditioner units and through which outside air is transfered for intimate contact with said liquid desiccant to remove water therefrom by means of heat transferred thereto by the heat exchanger.

13. An air conditioning system comprised for at least one independently operable air conditioner unit and each having an outside air inlet duct, a conditioned air supply duct into a conditioned space, and with a blower means to transport said air, and including;

an air dehumidifier means for processing a water vapor adsorptive liquid desiccant and with a contacter section in the inlet duct for interface contact of outside air with said liquid desiccant applied thereto to adsorb water vapor therefrom and thereby water saturating and weakening the desiccant, and a heat-pipe having a heat absorber section in the inlet duct following said contacter section for removing the heat of adsorption in dehumidified air therefrom, and a heat rejecter section in the relief exhaust air duct, there being a regenerater means for removing said adsorbed water vapor from said water saturated and weakened desiccant from the contacter section of the at least one conditioner unit and returned thereto for water vapor adsorption thereby, the said regenerater means being a multi stage desiccant regenerater boiler comprised of at least two stages and each with a pressure control means to operate at successively lower discharge of water vapor driven out of the water saturated and weakened desiccant, whereby desiccant returned to the at least one conditioner unit is strengthened, and heat source means applying heat to a first stage of the multi stage desiccant regeneration boiler.

14. The air conditioning system and dehumidifier means as set forth in claim 13, wherein water vapor discharge from one stage of the boiler to a successively lower pressure stage is through a heat recovery coil in said successively lower pressure stage and condensed thereby.

15. The air conditioning system and dehumidifier means as set forth in claim 13, wherein water saturated and weakened desiccant counterflows through the stages of the multi stage desiccant regeneration boiler from a stage of lower pressure to a stage of higher pressure.

16. The air conditioning system and dehumidifier means as set forth in claim 13, wherein the discharge of the water vapor driven out of the water saturated weakened desiccant is condensed and exhausted through a heat exchanger for transfer of heat into the weakened desiccant entering into the multi stage desiccant regeneration boiler.

17. The air conditioning system and dehumidifier means as set forth in claim 13, wherein the discharge of strengthened desiccant from the multi stage desiccant regeneration boiler is through a heat exchanger for transfer of heat into the weakened desiccant entering into the multi stage desiccant regeneration boiler.

18. The air conditioning system and dehumidifier means as set forth in claim 13, wherein the heat source means is at a temperature to establish a water vapor discharge pressure within a first stage of the multi stage desiccant regeneration boiler.

* * * * *